US007760721B2

(12) United States Patent
Stogel

(10) Patent No.: US 7,760,721 B2
(45) Date of Patent: Jul. 20, 2010

(54) METHOD AND SYSTEM FOR COMPUTER BASED INTERCOM CONTROL AND MANAGEMENT

(76) Inventor: Scott Stogel, Digital Acoustics, Inc., 1 Compo Beach Rd., Westport, CT (US) 06880

( * ) Notice: Subject to any disclaimer, the term of this patent is extended or adjusted under 35 U.S.C. 154(b) by 763 days.

(21) Appl. No.: 11/216,096

(22) Filed: Sep. 1, 2005

(65) Prior Publication Data

US 2006/0056386 A1 Mar. 16, 2006

Related U.S. Application Data

(60) Provisional application No. 60/606,142, filed on Sep. 1, 2004.

(51) Int. Cl.
*H04L 12/28* (2006.01)
(52) U.S. Cl. .................. 370/389; 370/352; 370/392
(58) Field of Classification Search .............. 370/351, 370/352, 353, 354, 355, 356, 389, 392, 395.2, 370/217, 218, 221
See application file for complete search history.

(56) References Cited

U.S. PATENT DOCUMENTS

| | | | |
|---|---|---|---|
| 4,035,592 A | 7/1977 | Baudoin | |
| 5,610,920 A | 3/1997 | Doll et al. | |
| 5,650,999 A | 7/1997 | Dickson | |
| 5,729,484 A | 3/1998 | Mack et al. | |
| 5,974,547 A | 10/1999 | Klimenko | |
| 5,983,192 A | 11/1999 | Botzko et al. | |
| 6,069,890 A * | 5/2000 | White et al. | 370/352 |
| 6,185,288 B1 | 2/2001 | Wong | |

(Continued)

FOREIGN PATENT DOCUMENTS

WO   WO-02/39315   5/2002

OTHER PUBLICATIONS

International Search Report for International application No. PCT/US06/01383, Sep. 18, 2006, Patent Cooperation Treaty.

(Continued)

*Primary Examiner*—Chi H. Pham
*Assistant Examiner*—Kevin Mew
(74) *Attorney, Agent, or Firm*—Morrison & Foerster LLP

(57) ABSTRACT

An audio communication system including a communication server with an operator interface coupled to a network and one or more audio communication terminal clients coupled to the network. The communication server is advantageously implemented in a PC based system connected to a network. The network may include the internet. In operation the server may monitor the network for a client connection request issued by one of the audio communication terminal clients. A TCP/IP network connection is established between the communication server and a client after said communication server receives a client connection request. Once the connection is established the server displays an indication of client connection request through operator interface. Alternatively an indication of the client connection request may be presented to the operator. The operator then controls the server based on inputs to the user/operator interface. The operator may respond to the remote client either by speaking, by playing a pre-recorded message or by transferring the connection and/or connection request to another communication server. The system may be have a fault tolerant feature whereby the audio communication terminal clients attempt to connect with and alternate communication server if the initial server is not available.

16 Claims, 16 Drawing Sheets

U.S. PATENT DOCUMENTS

| | | | |
|---|---|---|---|
| 6,233,616 B1 | 5/2001 | Reid | |
| 6,298,063 B1 * | 10/2001 | Coile et al. | 370/401 |
| 6,449,269 B1 | 9/2002 | Edholm | |
| 6,496,477 B1 | 12/2002 | Perkins et al. | |
| 6,733,437 B2 * | 5/2004 | Mackin et al. | 600/22 |
| 6,766,373 B1 * | 7/2004 | Beadle et al. | 709/227 |
| 6,768,726 B2 * | 7/2004 | Dorenbosch et al. | 370/331 |
| 6,850,503 B2 * | 2/2005 | Dorenbosch et al. | 370/331 |
| 6,930,709 B1 | 8/2005 | Creamer et al. | |
| 6,937,712 B2 | 8/2005 | Lemchen et al. | |
| 6,970,183 B1 * | 11/2005 | Monroe | 348/143 |
| 6,990,352 B2 * | 1/2006 | Pyhalammi et al. | 455/466 |
| 7,020,696 B1 * | 3/2006 | Perry et al. | 709/223 |
| 7,106,726 B2 * | 9/2006 | Vaziri et al. | 370/352 |
| 7,159,034 B1 * | 1/2007 | Rai | 709/238 |
| 2001/0033329 A1 * | 10/2001 | Zhang et al. | 348/143 |
| 2002/0062365 A1 | 5/2002 | Nishikawa et al. | |
| 2002/0141394 A1 | 10/2002 | Hardisty | |
| 2002/0174208 A1 * | 11/2002 | Morlitz | 709/223 |
| 2002/0188762 A1 | 12/2002 | Tomassetti et al. | |
| 2003/0190026 A1 | 10/2003 | Lemchen et al. | |
| 2004/0030791 A1 * | 2/2004 | Dorenbosch et al. | 709/230 |
| 2004/0230701 A1 * | 11/2004 | Sukigara | 709/253 |
| 2005/0002407 A1 | 1/2005 | Shaheen et al. | |
| 2005/0074031 A1 | 4/2005 | Sunstrum | |
| 2005/0089010 A1 * | 4/2005 | Rue et al. | 370/349 |
| 2005/0207357 A1 * | 9/2005 | Koga | 370/260 |
| 2005/0285734 A1 * | 12/2005 | Sheynman et al. | 340/539.21 |
| 2006/0056386 A1 | 3/2006 | Stogel | |
| 2006/0079993 A1 | 4/2006 | Warn et al. | |
| 2006/0079995 A1 | 4/2006 | Warn et al. | |
| 2006/0087993 A1 | 4/2006 | Sengupta et al. | |
| 2006/0090021 A1 | 4/2006 | Weidig | |
| 2007/0019571 A1 | 1/2007 | Stogel | |
| 2007/0047516 A1 * | 3/2007 | Kottilingal | 370/352 |
| 2007/0297394 A1 | 12/2007 | Allan et al. | |

OTHER PUBLICATIONS

International Searching Authority, Written Opinion of the International Searching Authority for International application No. PCT/US06/01383, Sep. 18, 2006, Patent Cooperation Treaty.

NCH Swift Sound, "Office Intercom Audio Communication Software".

Barix AG, Annuncicom IC User Manual Version 01.01, 2004.

Trilogy Broadcast Ltd., "Mercury IP Communications," Mar. 2002.

Stogel, U.S. Office Action mailed Jul. 21, 2008, directed to U.S. Appl. No. 11/205,016; (14 pages).

Stogel, U.S. Office Action mailed Dec. 19, 2008, directed to U.S. Appl. No. 11/205,016; (15 pages).

* cited by examiner

METHOD AND SYSTEM FOR COMPUTER BASED INTERCOM CONTROL AND MANAGEMENT

RELATED APPLICATIONS

This application is related to U.S. Provisional Application No. 60/602,042, filed on Aug. 17, 2004, entitled "Apparatus for Paired, Half Duplex Audio Communications"; U.S. Provisional Application No. 60/606,142 filed Sep. 1, 2004, entitled "Method and System for Computer Based Intercom Control and Management"; and U.S. patent application Ser. No. 11/205,016 filed Aug. 17, 2005, entitled "Apparatus and Method for Audio Communications," all of which were invented by the inventor hereof and expressly incorporated herein by reference. This application claims the benefit of the filing date of Provisional Application No. 60/606,142.

BACKGROUND

1. Field of Invention

The invention relates to a computer based communication system and more particularly to a computerized system and method for connecting, communicating and managing a plurality of network-enabled communication terminals. The system may advantageously be used in intercom applications. The system incorporates a computer and software to replace functions previously performed by electrical components in intercom control panels or 'head end' physical switching banks. The system can automate communication processes, manage automatic audio responses, examine operational modes and, accordingly, may interconnect each IP enabled audio communication terminal to a set of addresses. The invention may have the capability to transmit audio messaging to individual intercoms or audio communication terminals and may incorporate methods to remotely task the functions and re-connection destinations of remote IP enabled intercoms or audio communication terminals.

2. Description of Related Technology

Audio Intercom systems currently in wide distribution employ AC analog audio channels, DC control signaling and interconnect via copper conductor wiring. Individual intercoms generally terminate at a main system interface control box ('head-end') that may also be used as a central intercom control, often referred to as a "Master Station."

Such systems are known to be limited in capabilities, such as being fixed to a maximum number of intercom stations, being limited in the distance permitted to operate each intercom and often require specific interconnect wiring.

SUMMARY OF THE INVENTION

The invention described herein is an apparatus and a method of two-way audio communication over Internet Protocol where remote audio communication terminals may be connected, via Internet Protocol, to a personal computer using specifically programmed software. The apparatus may incorporate a combination of a computer and a software program operating within the computer, referred to herein as the "Console," which may provide audio data switching, command and control and a user interface for managing multiple remote intercoms.

The personal computer may incorporate multimedia support that includes a speaker and microphone, a network connection and standard peripherals such as memory, a hard disk, video display, keyboard, mouse and an operating system, such as Microsoft Windows®, or alternate systems such as Linux® or Apple OS X®.

The program may be a software program in the form of an Executable Application, DLL, API, OCX or format capable of performing the functions required to run the Console.

In the preferred embodiment, the Console may support and control audio connectivity to a single, or plurality of network-based intercoms or audio communication terminals such as the ii3-Intercom series available from Digital Acoustics, Inc., a PocketPC® device, or similar devices. Theses devices may contain electronic support for network connections, digital audio conversion, capability for management of the microphone and speaker audio switching, and support for network transmitted command language.

According to an advantageous feature, each IP intercom or audio communication terminal may have a network connection, may have an internal VoIP support system and may include a switch to provide a means for Push-To-Talk (PTT) communication to the Console. The IP Intercom or audio communication terminal may have a known IP address and may be assigned to connect as a TCP/IP client to the Console, normally assigned as the TCP/IP 'listener.'

The Console may have a known IP address, which may be one of the IP addresses of the PC. The Console software may be programmed to be a TCP/IP listener and act as a central receiver for connections from remote IP intercoms or audio communication terminals that are individually programmed to connect to the IP address and Port associated with the Console.

As each IP intercom initially connects to the system, the Console may accept or deny a TCP/IP socket connection. The software may employ a method to create multiple instances of listeners, using Windows Winsock or similar program, and automatically create increasing numbers of connections as needed. Once a connection is established the Console is able to communicate individually to any intercom or audio communication terminal via its multi-tasking software and the multimedia audio support on the PC.

The plurality of IP intercom connections hosted by the Console may extend into the thousands of units, limited only by the computers capabilities to create and handle the expanding listener connection instances in memory. The IP intercoms or audio communication terminals may be located on a LAN, or worldwide WAN via the internet. TCP/IP methods for data transport include common means such as Ethernet, Wireless and Fiber.

In normal operation the Console may be managed by an operator who is a individual trained to provide audio responses to calls from IP Intercoms or audio communication terminals, provide assistance or security information, listen to activity from an IP intercom or audio communication terminal and/or make outbound audio calls to IP intercom or audio communication terminal stations. The Console may be located at a sophisticated security command center, be incorporated on a PC used by an office or building receptionist, or reside on a basic home computer or laptop. In addition, or as an alternative, the Console may be programmed for automated operation or automated response.

The Console may be configured to deliver automatic audio messaging information to distributed IP intercoms or audio communication terminals and the ability to insure connection redundancy by providing the ability to transfer Console operations to alternate computers or facilities, worldwide.

Delivery of audio messaging may be streamed in coded audio TCP/IP packets, UDP broadcasting or other network protocols. The streams may be any data representing audio information, including real time voice, music or notification information such as tones. Advantageously, in the broadcast modes IP intercoms or audio communication terminals that are 'connectionless' and not linked to a particular console may be addressed by a unique identifier (such as a MAC ID) permitting individual or system wide data transmission and audio paging.

To achieve the ability for Console backup and operational redundancy, the Console may have the capability to re-address any IP intercom on the network, tasking it to connect to alternate Consoles. Advantageously, in the event that a Console becomes unavailable for connection, the IP Intercom stations may advantageously seek and connect to a one of any number of programmed 'fail-forward' Consoles.

Within a rule set, the failure recovery mechanism, may provide the audio communication terminals one or more alternate TCP/IP addresses to be used to restore connections in case of a network failure or event signals.

The failure recovery mechanism permits the present invention to overcome a limitation of using available Internet Protocol connections for enhanced reliability for use, for example in emergency audio message delivery and two way communication by avoiding DNS resolution or event driven pushbutton dialing.

In one configuration of the invention a reconnection may be attempted whenever the device is in a disconnected state. In a Second configuration the client may be commanded to reconnect to an alternate server from any connection state.

For implementation, the audio terminals may have a mechanism providing an array of server identifiers that may be stored in local memory. One alternative may be for memory to contain information to use a network-based lookup of server location identifiers, or advantageously use the lookup to update local memory at timed intervals. The server location identifiers specify alternate paths, ports and other means to connect to another server.

The referred to fail-forward method results from the Console's ability to accept connections from previously unknown and/or unexpected IP Intercoms. This results in a highly novel ability for basic system wide backup and redundancy. Because of the IP foundation of the Console (acting as a Master Station), any failure or destruction of the Master Station, disabling the intercom system, could be immediately remedied by the intercoms seeking another "active" console. Each IP Intercom may have several IP destinations, including alternates and failure destinations that each intercom may seek if a primary failed, permitting connections to secondary consoles at secondary locations. It is clear that in known wired intercoms systems, a serious failure (fire, etc) at the Master Station cannot be automatically resolved. The system is disabled until it is repaired or replaced and in current security systems this time could extend to days or weeks, rather than the inventions ability to restore operation in seconds.

Advantageously, the Console may have the ability to manage multiple, simultaneous incoming calls. In such a case the Console may incorporate a storage device to save incoming audio messages, visually display a call waiting status and respond to the caller automatically with a pre-programmed audio message that may relate to the Consoles real time state. An example envisioned may be a Console 'Unattended mode' such that when an audio communications terminal calls and the operator is engaged in a conversation session an automatic reply is transmitted saying "We are unavailable to take your call at this time". An additional feature may be for a "busy" Console to forward an incoming call to one or more alternative Consoles. Alternatively, a Console may have multi-operator capabilities and a means of supporting multiple Consoles, connected and managed by a computer Console server application program.

Global benefits provided by the Console include cost saving features achieved by creating a Master Station in software, providing a means for virtually unlimited station expansion reaching to worldwide locations and connection cabling that uses existing networking connection techniques.

The simplicity of the method allows the Console and a plurality of IP intercoms to be easily configured. According to the invention, the Console and IP Intercoms do not require SIP (Session Initialed Protocol), H.323 gateways, but rather, may use simple client-listener TCP-IP connections.

The software, according to the invention, may optionally exhibit the following features and/or advantages.

Graphical Interface screen for one or multi-operator control

Keyboard or mouse, or external switch control of the Talk and Listen button

Automatic detection and connection with arrays of IP intercoms

Communicate with a single or multiple Intercoms concurrently

Incoming call indication and notification

Message on hold audio and ability to send automatic response audio to an Intercom Console forwarding and retrieval, permitting IP Intercom reassignments.

Ability for system wide central station redundancy and backup

Audio archive and playback functions

Remotely control an IP Intercom's Door and Relay or other switching

Remotely adjust an IP Intercom's audio transmission state and volume

Manage an IP intercom's primary and alternate destination server IP addresses

Provide means to support converters for legacy analog audio devices and control systems Rules to manage communication sessions that may include:
  Ability to send pre-recorded messages to IP Intercoms based on operators status
  Ability to transfer unanswered calls at a pre-determined call queue limit or time period.
  Ability to prioritize urgency and other factors to set the location of a call in a call queue
  Ability to act on a queue with information about the state of operation in other Consoles
  Ability to transfer and restore connections based on system rules and conditions

DETAILED DESCRIPTION OF THE PREFERRED EMBODIMENT

Figure 1:
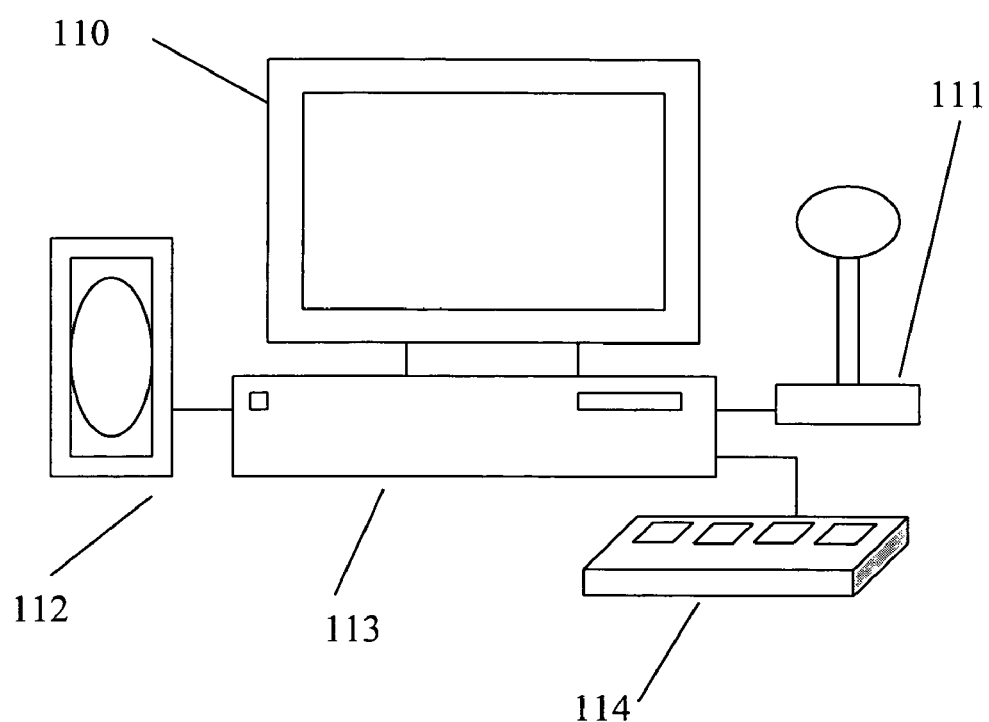
FIG. 1 shows a Console according to an embodiment of the invention; a Personal Computer, configured for Multimedia support.

FIG. 1 shows the apparatus proposed for the Console. In a preferred embodiment a Personal Computer (113) is shown configured with a processor, memory, data storage, supporting electronics and having a device to connect and transfer data on a network (not shown in drawing). The computer may support a graphical display (110), a speaker (112) and microphone (111) electronics and may be controlled by a keyboard, mouse or other functional input device (114). Advantageously, the computer may be a laptop, PDA, or a similar system that may be enclosed in a dedicated enclosure and may be designed specifically to support the Console software.

Figure 2A:
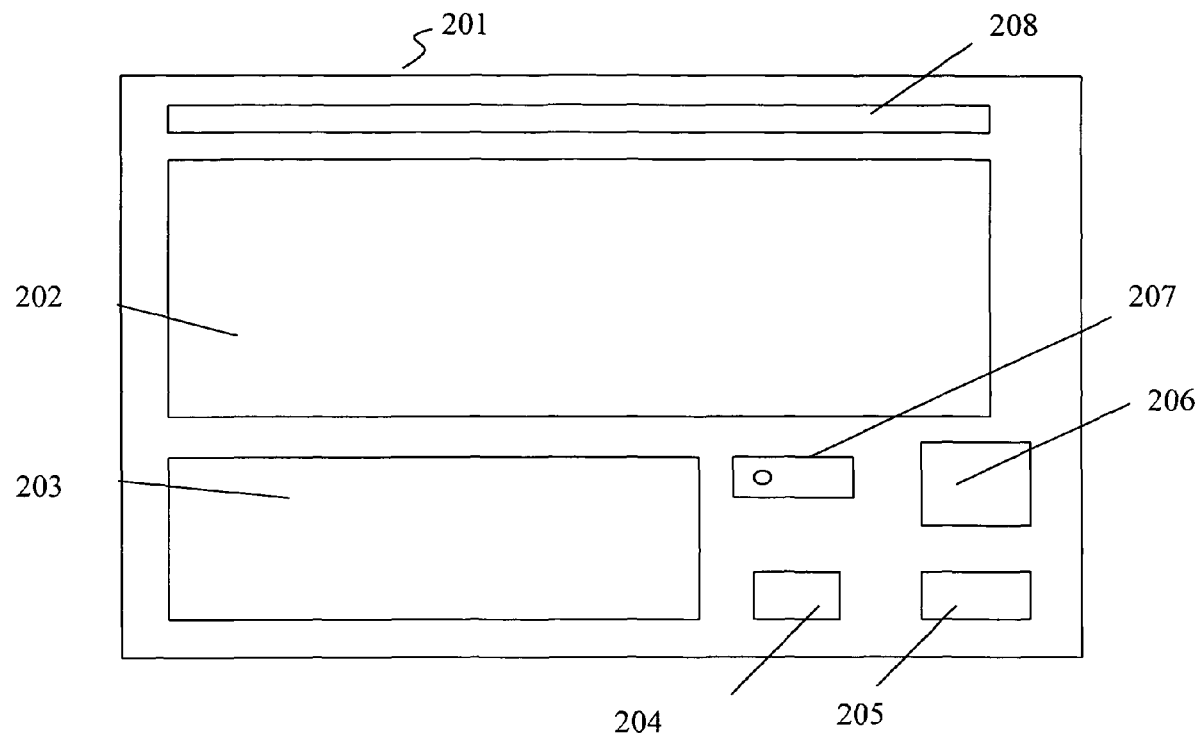
FIG. 2A/2B shows a Console Software user Interface.

FIG. 2A schematically shows a Console graphical interface (201). As shown in the preferred embodiment the interface may be formatted so as to fit across a PC monitor display, and may contain mouse (and keyboard) driven input and visual output interfaces. Such a interface may be altered to include alternate output formats such as PDA or LCD screens, visual indicators and audio signaling and input formats such as physical inputs comprising actuators, sensors, touch pads or voice control.

In the interface shown (201) the overall control may be via a menu system (208), dynamic and selectable information displays (202,203) and user controls (204-207). The menu system (208) may provide access to additional screens providing the ability to remotely program and change IP Intercom connection destinations, provide additional user options and configure the system feature set.

The screen panel (202) may display a list of IP Intercoms that have made a network connection to the console and may indicate their current operational state. In the event that a conversation is in progress or the human operator in unavailable to answer subsequent calls, a calls-waiting panel (203) may contain a list of calls that are in a queue waiting to be answered. The display (203) may be dynamic and provide real time information as to the state of the caller's request, ranging from emergency priorities, times of calls state of automatic recording of received events.

The ability to Talk and Listen to an IP Intercom may be controlled by 'clickable' interfaces 204 and 205. On incoming calls the Console operator may respond to a call by a mouse click on the TALK graphical image (205) and similarly click the LISTEN graphical image (204) to listen. Selecting individual intercoms to initiate a call session is accomplished by clicking on the desired IP Intercom listing in panel 202. Terminating a call session may be accompanied by again clicking the highlighted listing or other means, such as a mouse right-click.

In the preferred embodiment a means to create arrays for IP Intercom paging and transmitting to specific areas is accomplished by a Talk Mode selection (206). The ability to select an individual IP Intercom, a Group or All intercoms is shown.

A simple manual control (207) may provide the ability for the operator to intentionally leave a Console unattended, triggering automatic audio "I am not available" messaging to be played to all incoming callers. Such messages may be stored in audio wav files, be in recorded, be streamed in from another network source, exist multiple languages and be part of a plurality of messages that are delivered based on system wide setting and events.

Additional features of the Console IP Intercom display panel (202) may include the ability to display the state of, and control actuators and relays on IP Intercoms. This provide a means to open doors, read sensors and show digital access authorization information that may be supported in particular IP Intercom feature set and presented directly on the Console screen.

Figure 2B:
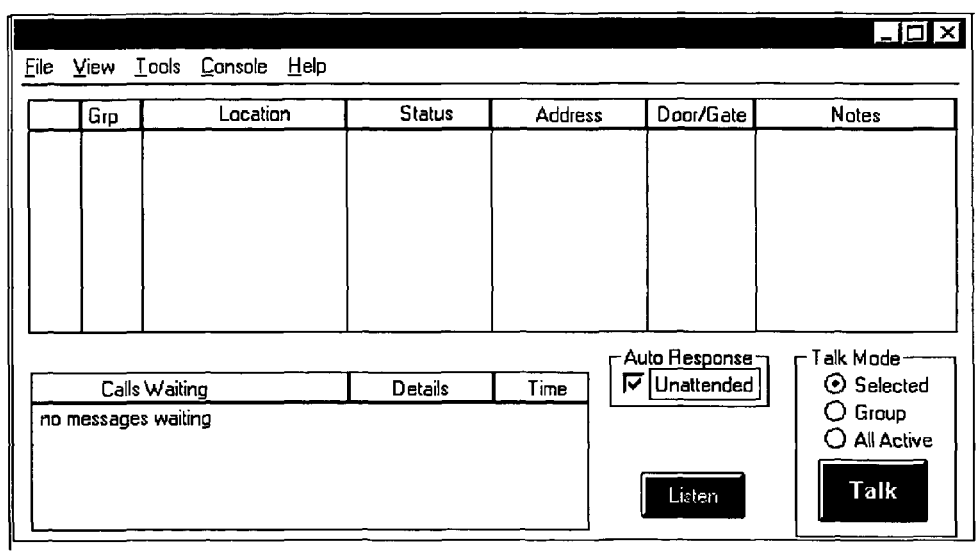

FIG. 2B shows an example of a user interface consistent with the schematic shown in FIG. 2A.

Figure 3:
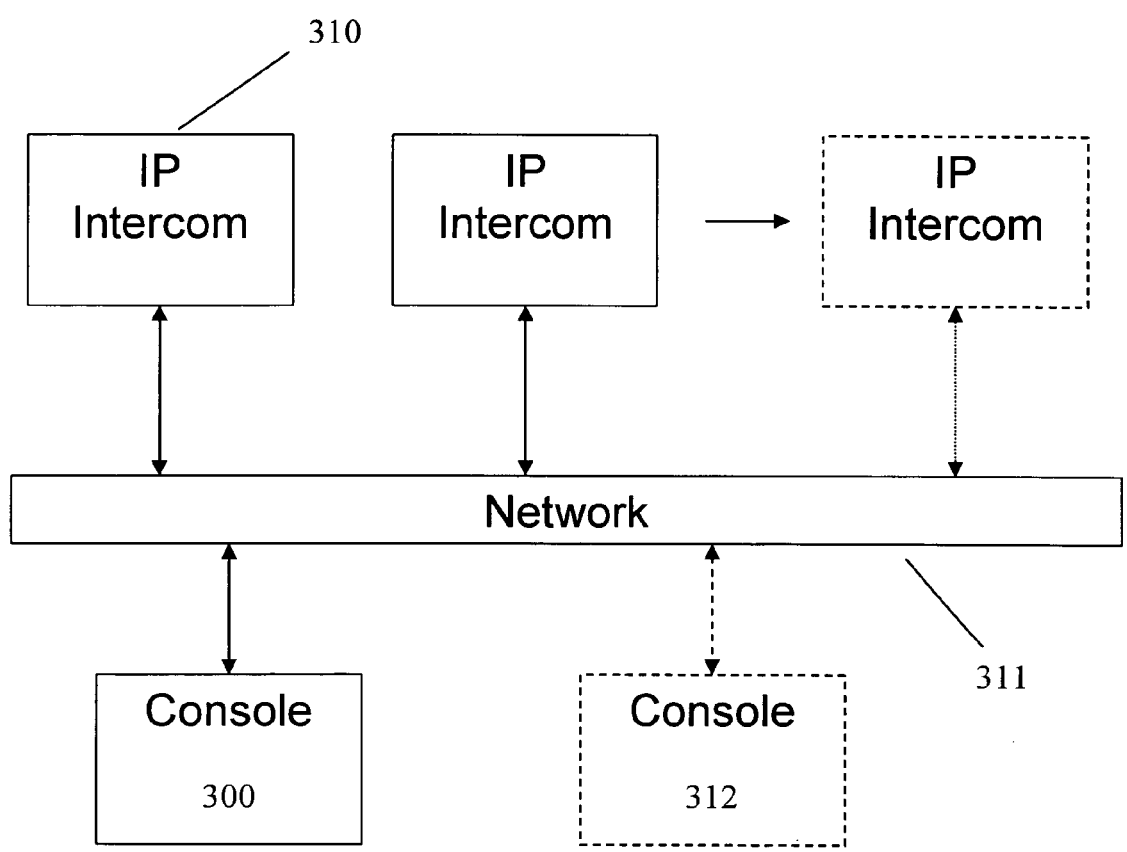
FIG. 3 shows plurality of IP Intercom hardware devices, each in client mode, all seeking and connecting to Console.

FIG. 3 shows a basic system wide configuration with a Console (300) and a plurality of IP Intercoms (310) on a network (311). As IP Intercoms are connected to the network, each may seek to connect to a pre-programmed Console (300) at a known IP address and port. In the event that a primary Console executes a transfer command or otherwise becomes unavailable, each IP Intercom may seek any number of alternate Consoles (312). The limit of IP Intercoms and Consoles that may interconnect is limited in large part to network capacity and may easily extend well beyond hundreds of stations. When broadcasting support exist on networks, a Console may use broadcasting techniques to transmit audio information and control data to 'unconnected' intercoms via UDP and other compatible protocols. This permits a plurality of consoles to contact a plurality of IP Intercoms. Additionally, the network shown may be a LAN, wireless (such as 802.11/Bluetooth), optical, Power-Line or WAN (including the Internet) or combination of these networks.

Figure 4:
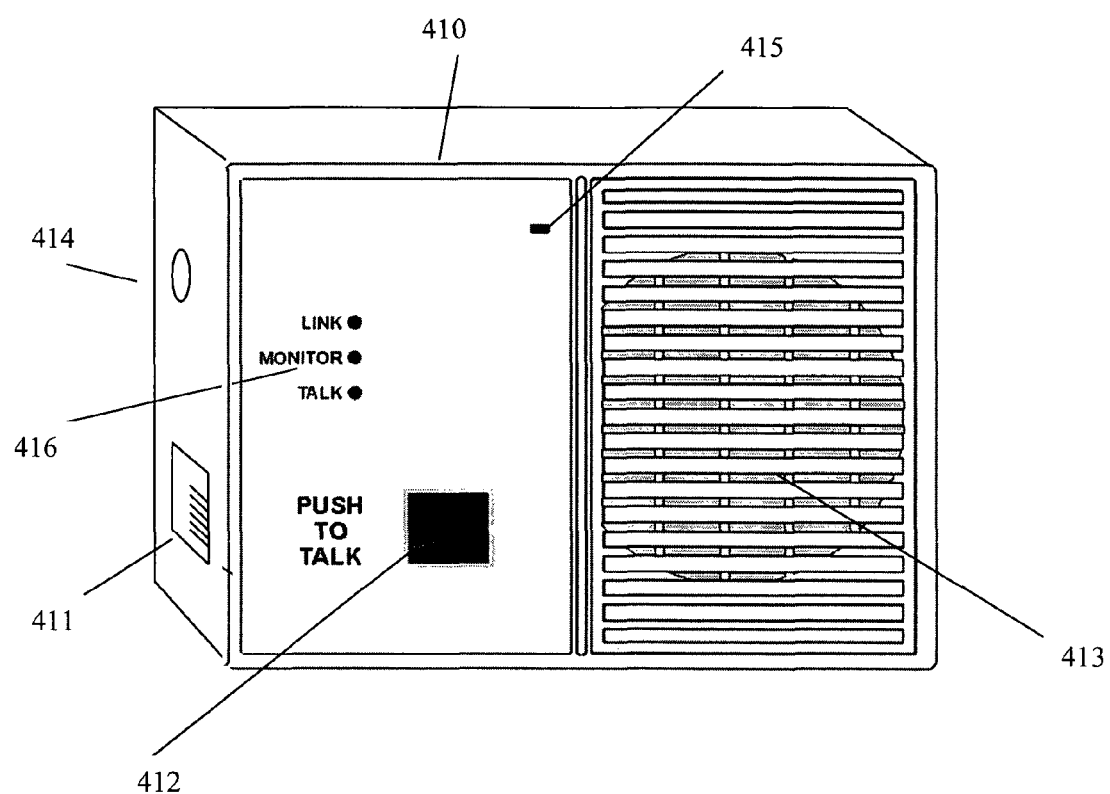
FIG. 4 shows a schematic of an embodiment of an IP Intercom according to the invention.

FIG. 4 shows an IP Intercom in detail. In the preferred embodiment the Model ii3-IP Intercom available from Digital Acoustics, Inc. (410) is shown housing a power (414) and RJ45 type network connector (411), a Microphone (415) and Speaker (413), and a Push to Talk actuator (412).

Link, Monitor and Talk Activity LEDs are also represented (416).

The IP Intercom shown is self-contained and resides in a small enclosure, incorporating required power management, a network processors, a Codec, a transducer with support electronics and indicators. Existing and new intercom interface enclosures may be fabricated in alternate combinations including wall mounts, steel vandal-proof plates, weather-proof speakers and include larger Call/Talk Signaling buttons and specialized handsets housing the microphone and speaker elements.

Figure 5:
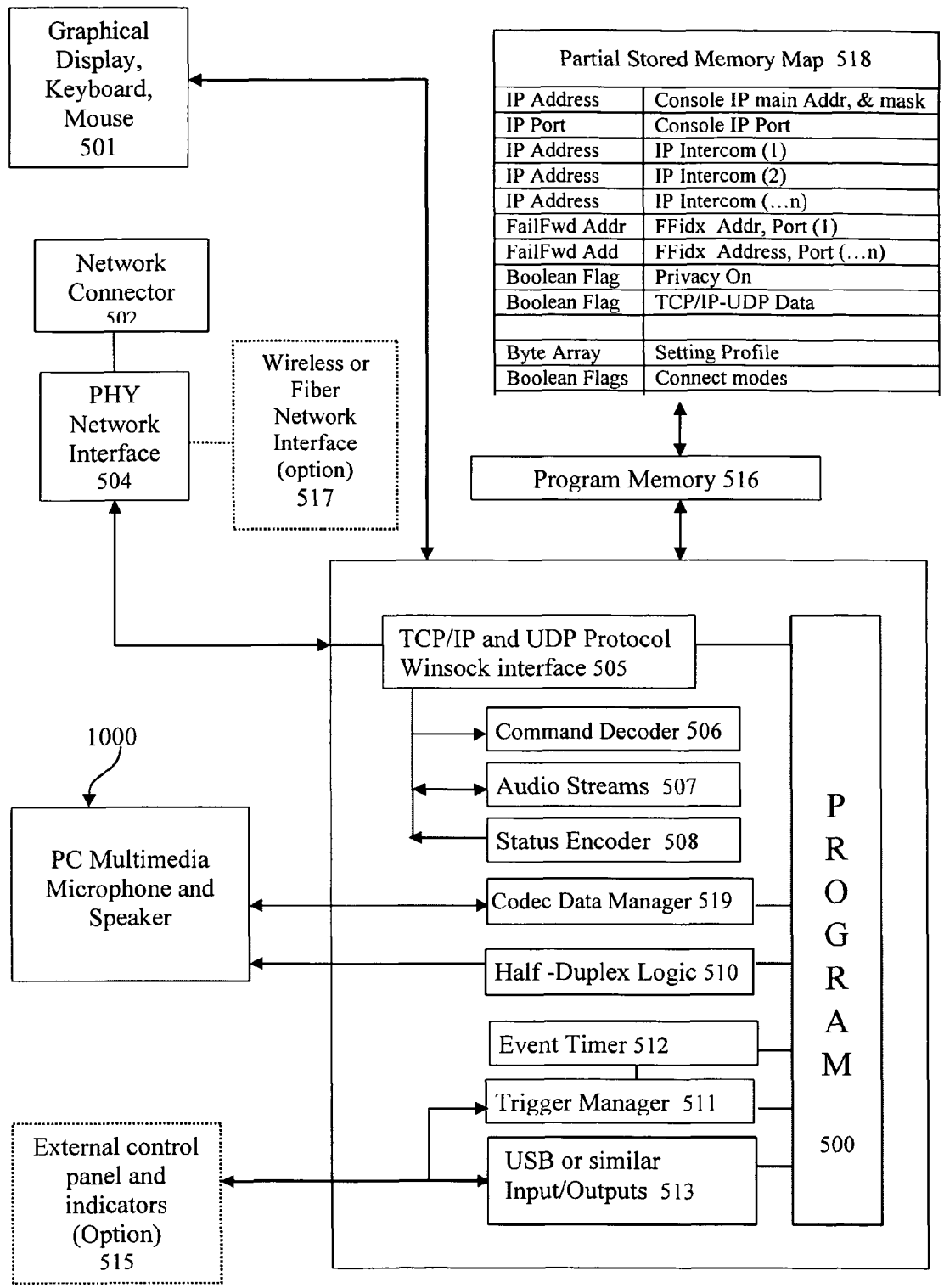
FIG. 5 shows an embodiment of an intercom device according to the invention.

FIG. 5 shows a system flow chart of the Console, including memory and basic programming routines (500), network data connections, and user input/output controls. The network connection (502) described may be an RJ45 interface connected to a PHY interface IC, such as a RealTek 8139 (504). Other network connections (not shown) may include higher speed networks, wireless 802.11 and optical (517), bluetooth and power-line solutions that all capable of transport data using TCP/IP protocol.

A graphical and user interface (501) is shown and may be in the forms previously referred to in 201.

The electronics for processing the program do not require extensive DSP processing power. In the example shown a processor such as Intel 486 with 96 MB RAM may be employed. Processor speed of 366 MHz devices is known to provide sufficient processing speed.

The program (500) contain algorithms to handle basic functions.

The TCP/IP and UDP data manager (505) may be used to establish and hold connection states and manage packet for reception and transmission in the form of a Winsock TCP/IP "Stack". A key element used in this management is the connection mode attempted. The Console is configured as a TCP/IP Listener, and expects to be contacted by an IP Intercom configured as a TCP/IP Client to make a valid "Connection" whereby usable device operation data and digital audio may be transferred.

Data from the TCP/IP and UDP data manager 505 is transferred via a method that includes commands and data establishing certain functions listed in Table 1. Other functions are possible. Audio data may be incorporated between commands or contain commands when transferred serially in real time. Video or other data may also be transferred in versions envisioned.

The Command Decoder (506) may parse incoming data for remote instructions that may include signaling and status commands from IP Intercoms. They may also contain cryptographic keys and subsequent data stream information that may be used for remote servicing and data security. Advantageously, arriving data may be received as a broadcast, and received in a form such as UDP data packet, and may contain command information, memory programming information and/or an audio packet stream. In such cases the decoder (506) may manage the data by detection, setting or the memory flags TCP/IP-UDP (518) and timing the decoding of incoming UDP packets decoding as needed. The detection of UDP and TCP/IP modes may be a function of the decoder and network stack within the TCP/IP and UDP data (505).

The Command Encoder (508) may create formatted code commands that, when transmitted, send signaling information to the IP Intercoms. This can be a signal to open a door relay or a signal indicating the start or end of an audio transmission and contain signaling codes effectively turning on the local microphone from a remote location by a network signal. A UDP broadcast technique may be used to exchange data information prior to an actual client-listener paired connection, and is particularly useful for system setup and configuration The Audio Stream section (507) manages software based compression techniques to provide known technologies such as uLaw or GSM compression, tone generation, voice activated transmission control (VOX level detection) and encryption/decoding security algorithms applied to the audio stream itself.

The Half-Duplex Logic controls (510) may be implemented within the program (500). The Half-Duplex Logic control may be configured to allow 2-way communication via Push-To-Talk, wherein each party in a paired communication may either listen or speak at alternating intervals. The process provides for a simple conversation mechanism such as Half-Duplex or hands-free (speakerphone) style communication while maximizing the available bandwidth on the network by having a single audio stream transferring at any point in time (to or from the apparatus). This operational method also prevents acoustic feedback eliminating the need for DSP based echo-canceling processors.

Advantageously the Half-Duplex logic (510) may be controlled by the Trigger Manager (511); enabling a remote command from (506) to be used to control the state of the Trigger. In addition the Half Duplex logic may be further controlled by automatic time-out section (512) to return the trigger to the idle mode after a period of time, such as an "operator idle" or inactivity period.

The logic management may optionally be used to tell the Audio Stream Manager (507) to generate a beep at the end of the audio transmission, effectively informing the remote human operator the audio channel is free and they may reply by voice. This is an operational mode, using beeps, that is commonly used in cellular communications (such a Nextel Push To Talk™ walkie-talkie).

TABLE 1

Sample Packet Stream

| cmd-code | <value> Optional | cmd-code | Audio stream PCM/Compressed | cmd-code |
|---|---|---|---|---|

Sample Command Codes

| Name | Value | Description |
|---|---|---|
| cmd_PICFLASH | 10 | Program flash memory |
| cmd_TXcode_ON | 11 | Tell IP intercom to play audio |
| cmd_TXcode_OFF | 12 | IP Intercom play off |
| cmd_NVWRITE | 13 | Write a value to the intercom profile |
| cmd_PING | 14 | Ping the intercom, |
| cmd_BABYON | 15 | Set intercom to monitor 'listen' |
| cmd_BABYOFF | 16 | Clear intercom to monitor 'listen' |
| cmd_TRANSFER_IP, <data> | 17 | Send IP Transfer Information |
| cmd_SET_LED_STATE | 18 | Set led state, byte |
| cmd_SET_TONE | 19 | Generate TONE FREQ, MSB (*255) |
| cmd_DOOR_OPEN | 22 | Command - open the door relay |
| Received Code Status Information | | |
| cmd_DOORISOPEN | 79 | ACK door opened |
| cmd_DOORISCLOSED | 81 | ACK door closed |
| cmd_MICISON | 82 | IP Intercom microphone is on, enable speaker |
| cmd_MICISOFF | 83 | IP Intercom microphone is off, disable speaker |
| cmd_GETTRANSFER_IP, <data> | 85 | Receive IP Transfer Information |
| cmd_READ_ST_CFG | 86 | Send status byte set |
| cmd_MICON | 87 | IP Intercom microphone depressed |
| cmd_MICOFF | 88 | IP Intercom microphone un-pressed |

A USB, Firewire, RS-232 (513) or similar interface may be incorporated to provide a means of reading and controlling hardware lines. Such lines may be relays, sensors, indicators, actuators, and detectors (515) used for any purpose, including control of the Console itself interface and external security and access control.

FIG. 6-12 shows a flowchart outlining some of the features described in the program (500).

Figure 6:
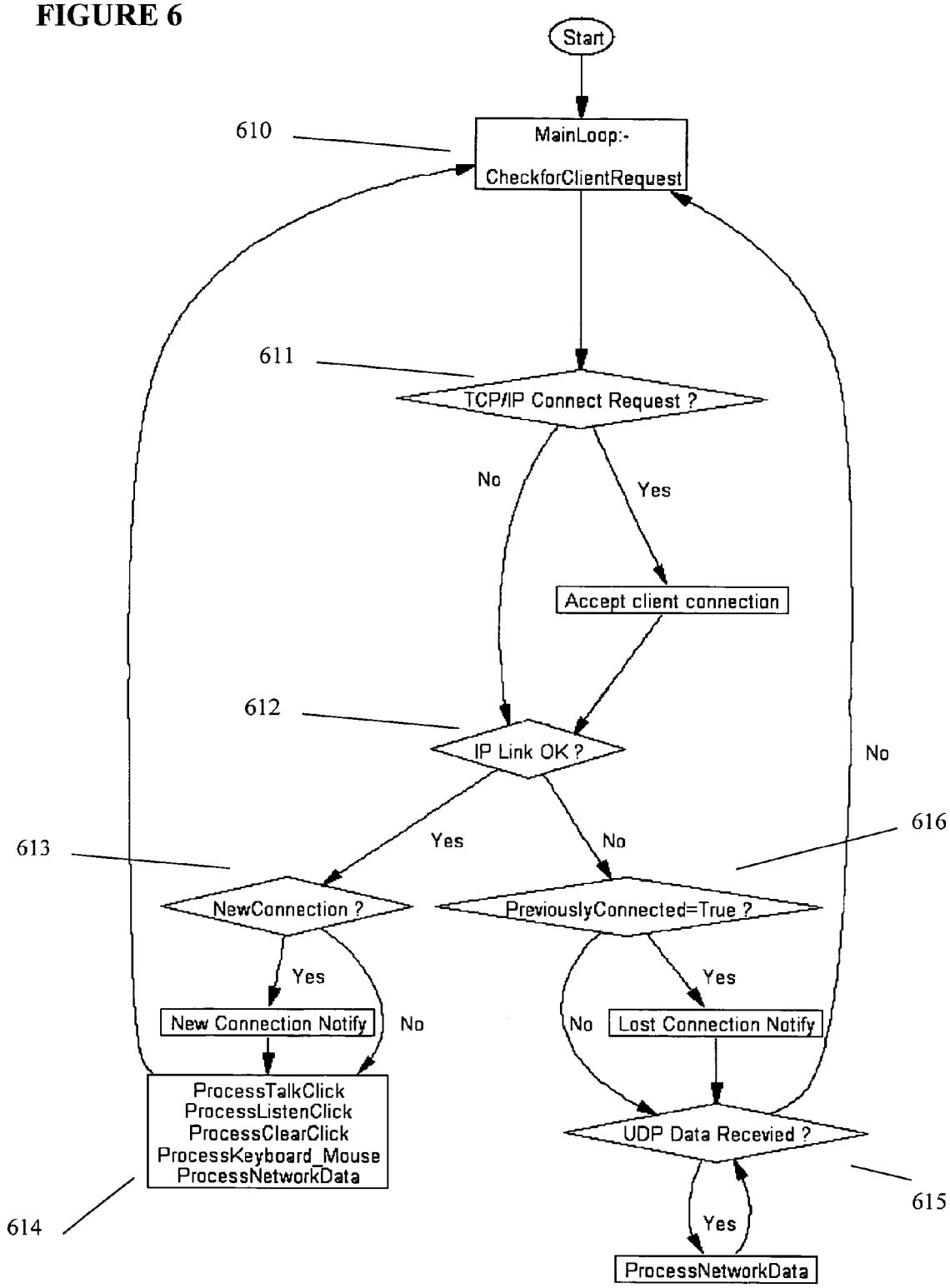
FIGS. 6-12 show a flowchart of a method according to an embodiment of the invention.

FIG. 6 commences in a loop (610) that begins after traditional power-up sequences and hardware initialization (not shown) executed at program startup. The loop runs to check and manage connections from IP Intercoms requesting connect servicing (611). Accepted connections are continually tested (612) and added ((613) and removed (616) to the Console listing panel described in 202. As IP Intercoms are added and removed to 202 the program memory (518) is updated to manage the instances of Winsock TCP/IP stacks required.

All network data may be examined and decoded for global broadcast information. This provides a means for the Console to detect information emitted from IP Intercoms prior to TCP/IP connections, as shown in 615, and may be used for command and control data transfers.

Connected intercoms are added to a listing in a memory array to provide for each connected intercom to maintain a unique profile and individually data set. This data set may include transmit and receive status or a block of memory containing audio packets exclusively allocated for the referenced intercom. In traditional programming this may be in the form of a 'type array'. A series of events are carried shown processing data of connected intercoms. The repeating loop outlines 5 common processes (614) used in the preferred embodiment. Other processes may be substituted and added to those shown.

Each process is a subroutine and is outlined in subsequent FIGS. 7-12. All return to the caller at 614 as shown in their respective "Return" blocks.

Figure 7:
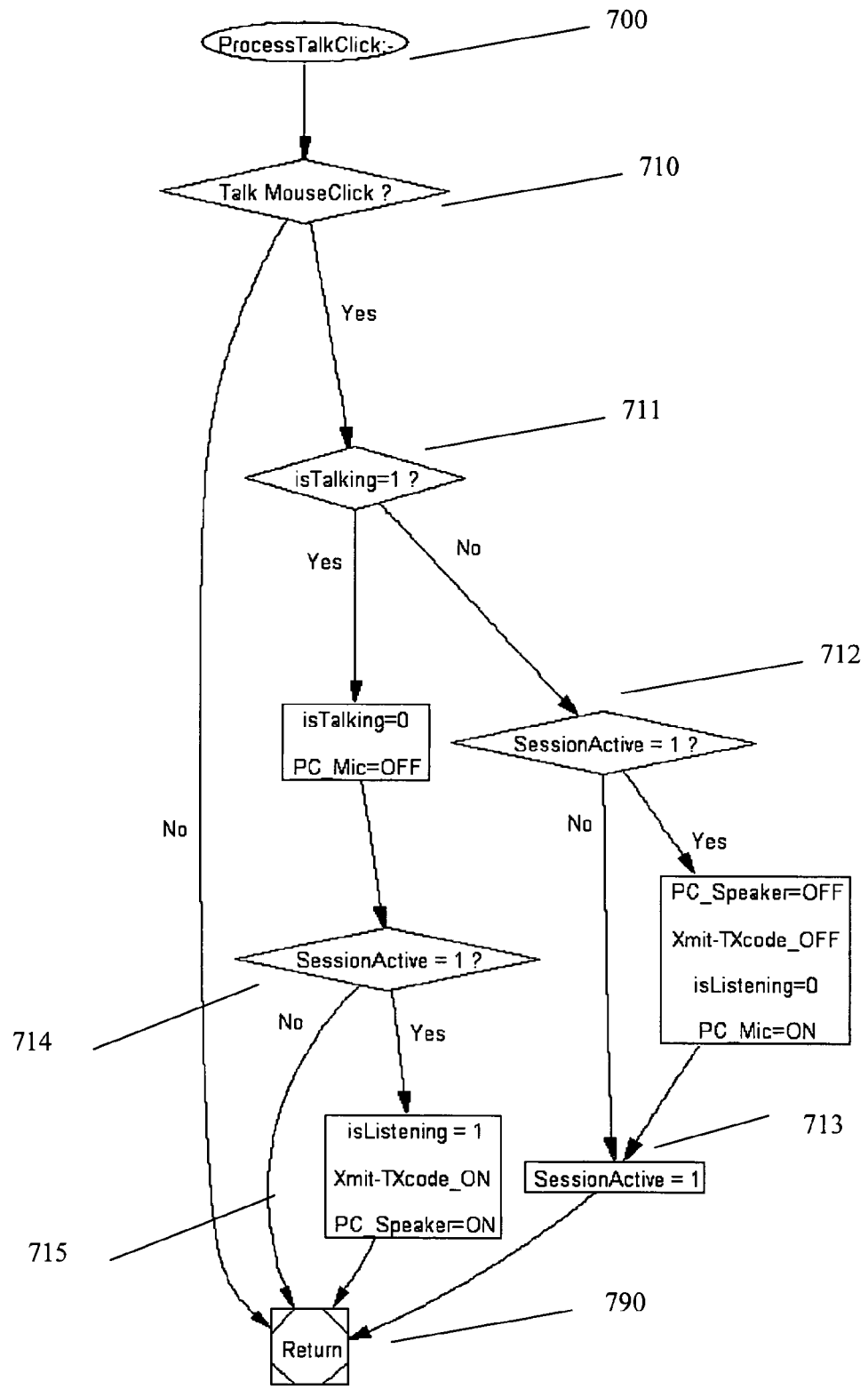

FIG. 7 outlines a subroutine (700) invoked when the TALK action is engaged, as described in 205. If the talk action is invoked (710) the is Talking flag will toggle to a reverse state. If activation occurs (712), beginning an active talk session (SessionActive=1) the Console Microphone is enabled, operational flags are set further enabling background tasking of real time audio data to be digitized and sent to IP Intercom connected to the Network.

Conversely, if the toggling results in the is Talking flag reversing to the 'not-talking' mode (711) a further test of SessionActive=1 in (714) can be used to enable the Half Duplex conversation state, automatically turning on the remote IP Intercom microphone and enabling the Console to listen via the Console Speaker (715).

In this manner the Talk button on the console may provide for Handsfree conversation on the distant IP Intercom. This state will be maintained until the SessionActive is intentionally cleared in ProcessClear (910) and set to 0.

The process returns to the caller at 790.

Figure 8:
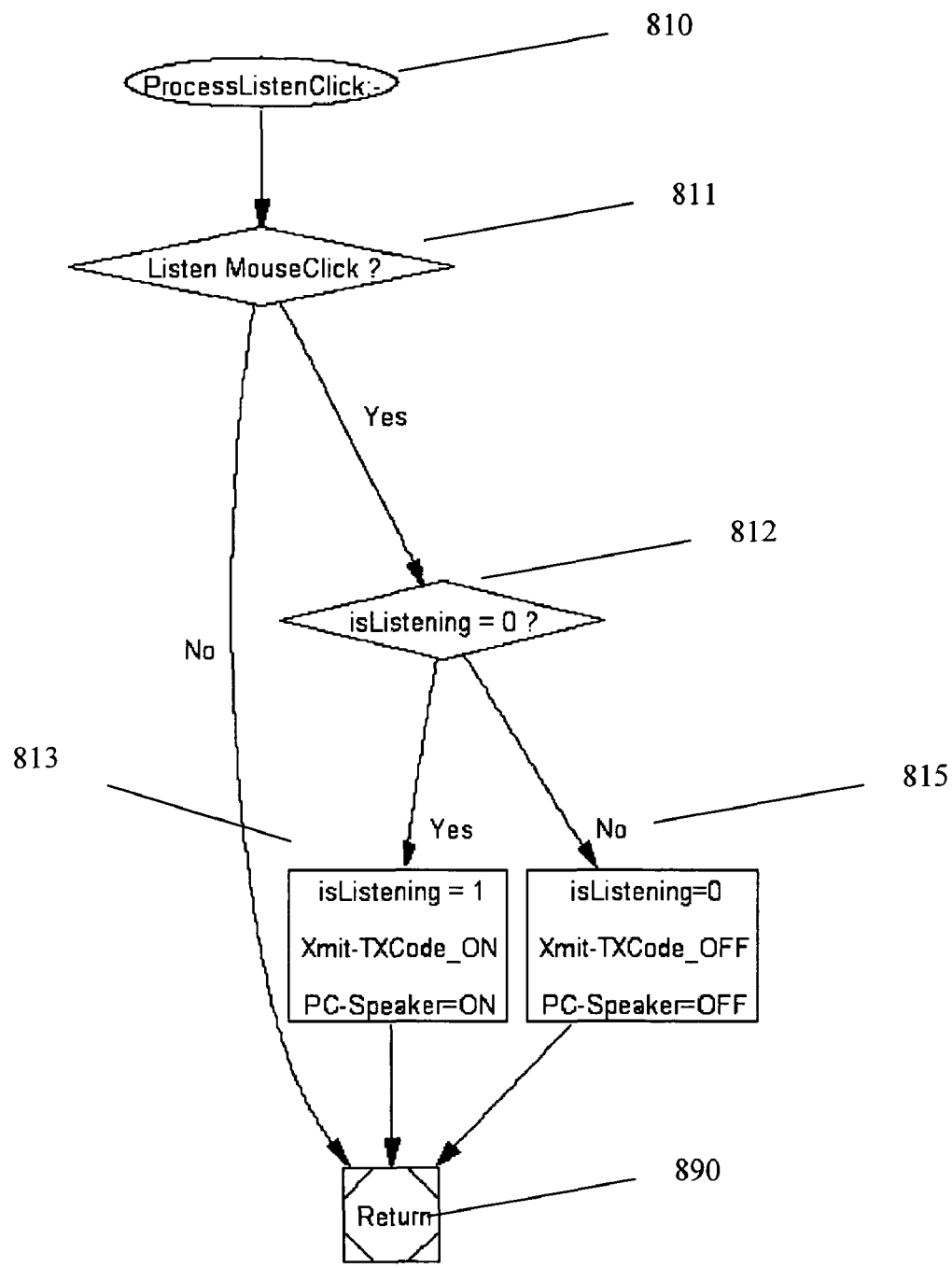

FIG. 8 outlines a subroutine (810) invoked when the LISTEN action is engaged, as described in 204. If the listen action is invoked (811) the isListening flag will toggle to a reverse state (812). The isListening State is further examined to control speaker signaling. If isListening is newly enabled the Console speaker is set ON (813)) and the IP Intercom is instructed to send microphone audio to the Console. Additionally enabled is the ability of the background tasking to decode received digitized audio from the network, convert it to analog and present the signal to the speaker for listening. The OFF (815) state reverses this mode and sets the speaker and flags OFF and back to idle modes. The process returns to the caller at 890.

Figure 9:
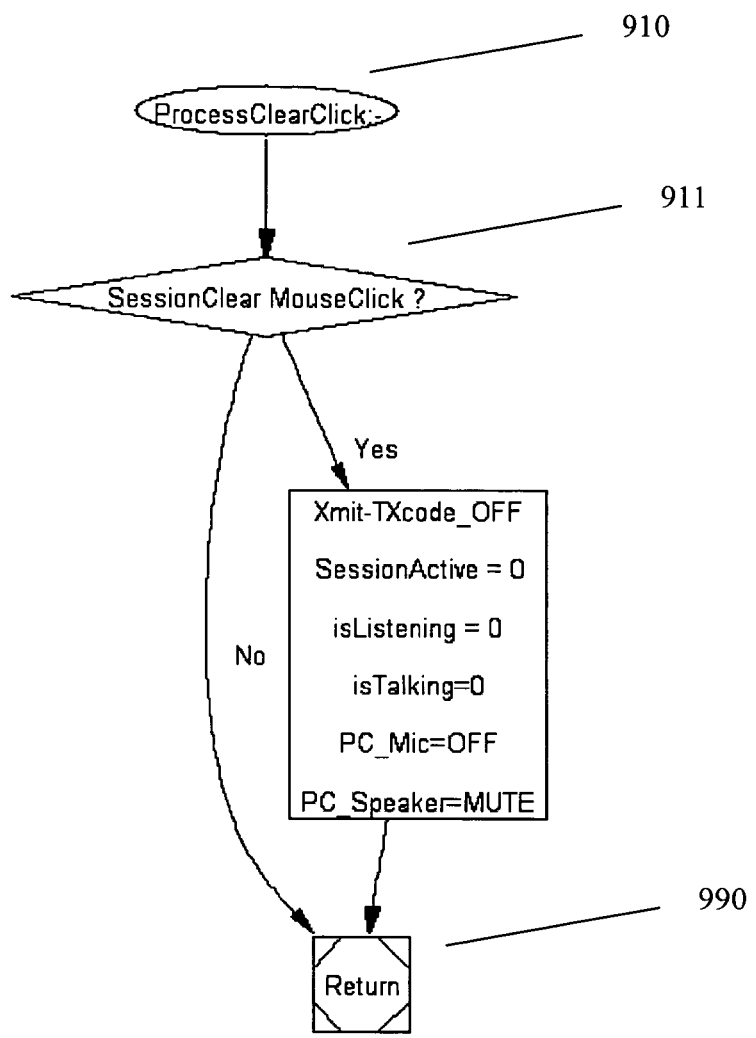

FIG. 9 outlines a subroutine (910) invoked when the operator has completed a conversation and wishes to return the Console to a standby mode. A flag is set to SessionActive=1 during a conversation in progress and is conversely set SessionActive=0. An operator may clear the session in several preferred means such as a right button mouse click, a click on a user graphical image or other methods (911). When clearing is asserted the Microphone, Speaker, digitizing codecs and flags are all reset to idle to enable a new session to be engaged at a later time. The process returns to the caller at 990.

Figure 10:
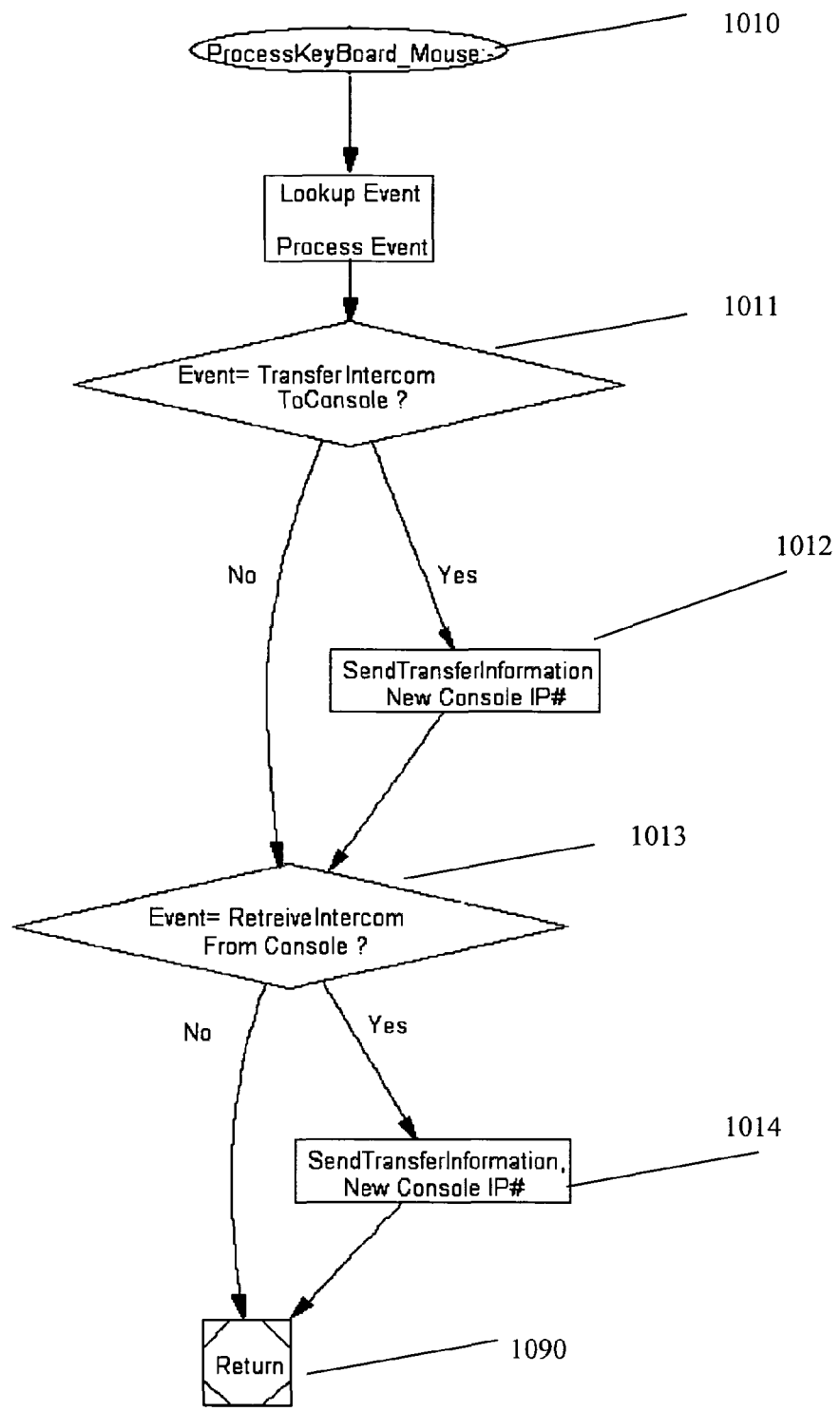

FIG. 10 outlines a subroutine (1010) invoked when the operator makes a menu selection referred to in 208, and specifically when the operator wishes to transfer or retrieve an IP intercom, effectively moving the IP Intercom connection from Console to Console.

Operator actions may be keystrokes and mouse-clicks, invoking a lookup-event and process-event sequence. An example is shown using the case of a request to reassign an IP Intercom to a new address (1011). As shown the program will build a Command Code (Table 1), add the desired flags and IP address and/or port and transmit a packet containing the formatted data to the network. This enables transfer (1012) and restore (1014) data packets to be managed from a console. This example may be expanded to provide other data transfers and IP Intercom control actions.

Figure 11:
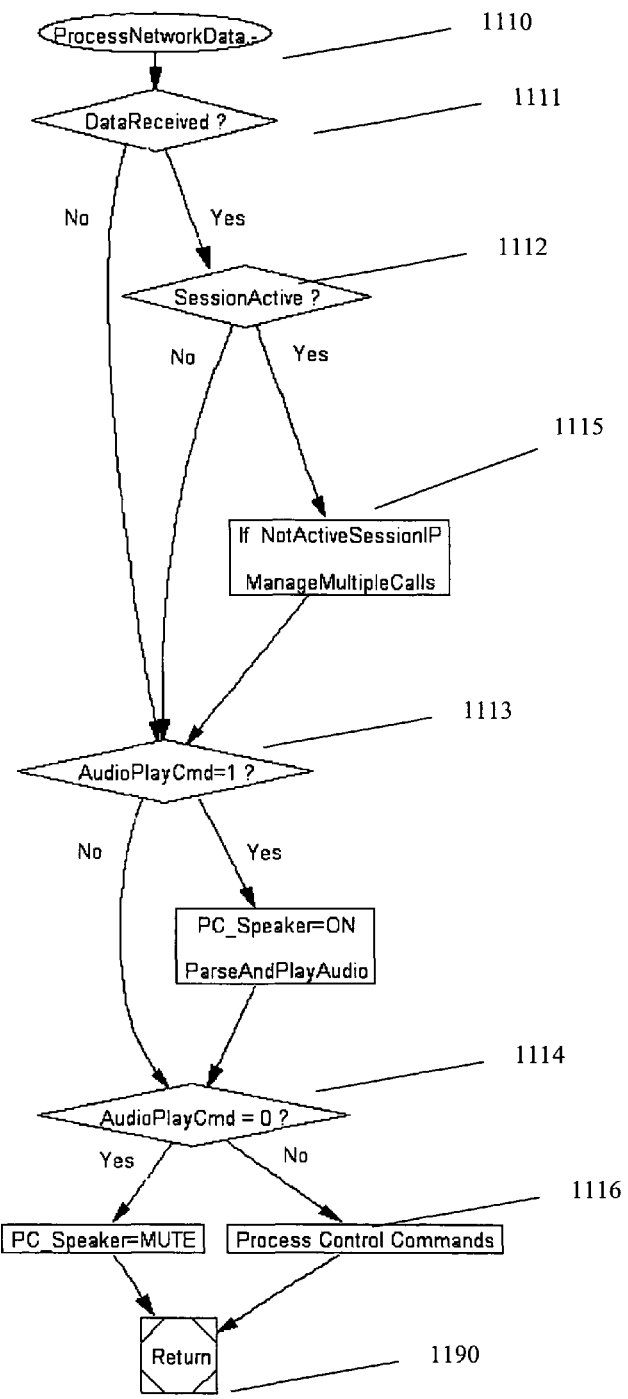

FIG. 11 outlines the various states employed to process incoming network data. Parsing the data involves determining if the data is comprised of control codes (Table 1) or part of an incoming digitized audio stream. When data is received (1111) a determination of the state of an active conversation is made (1112). If SessionActive=1 the data is further examined in a Multiple-Call handling routine (1115) and described in FIG. 12.

Subsequently a memory flag (AudioPlayFlag) indicating a previously invoked play command signal (Table 1) is tested (1113). If set to 1 the audio is converted from the digital state and played to the speaker. If AudioPlayFlag=0 (1114) then the speaker is secured in the Off/Muted mode.

If audio is not active, data is assumed to be solely commands and will be processed by subsequent routines and algorithms invoked by the program (1116). The command are shown in Table 1 are part of the preferred embodiment.

The process returns to the caller at 1190.

Figure 12:
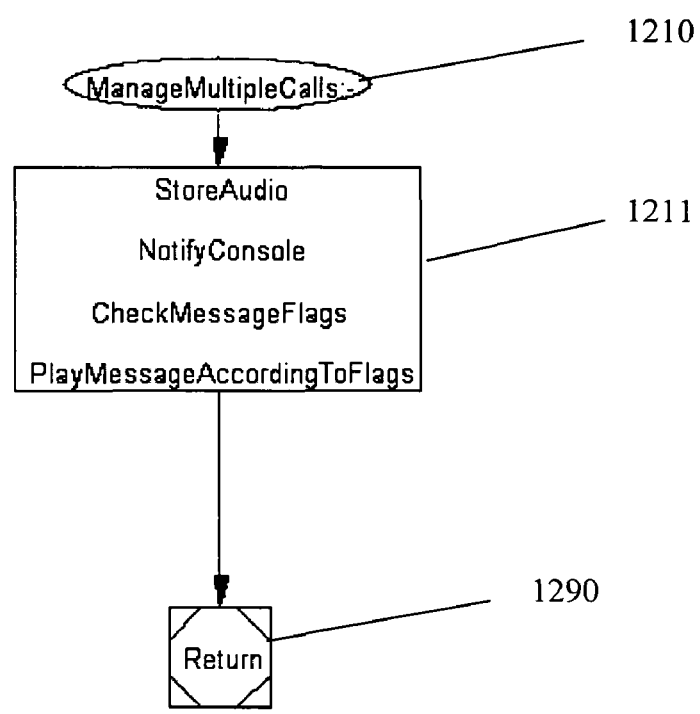

FIG. 12 outlines a subroutine (1210) invoked when an conversation session is in progress (SessionActive=1) and a remote IP Intercom attempts to establish a call to the Console operator as described in 1115. When SessionActive flag is set, memory information is recorded with the associated IP address (or unique identifier) used to establish the initial conversation. If network data and subsequent audio arrives from a different IP address, indicating a new call, and detected in the routine 'NotActiveSessionIP' (1115) then the routine 1210 is called providing various the steps and functions (1211) as part of an automatic operator response system.

These steps may include: Storing incoming audio in a format suitable for subsequent archiving and playback, notifying the operator on a graphical screen panel (203), examining message flags to determine Console operational states, including priority and callers urgency level and returning an audio message to the caller with a prompt or instruction, in a manner described in 207. The routine return to the caller (1115) at 1290.

FIG. 13-17 is shows detail of the process previously referred to as 'Fail Forward'. It is a routine embedded in the processor of the client intercom, related to the connection process.

Figure 13:
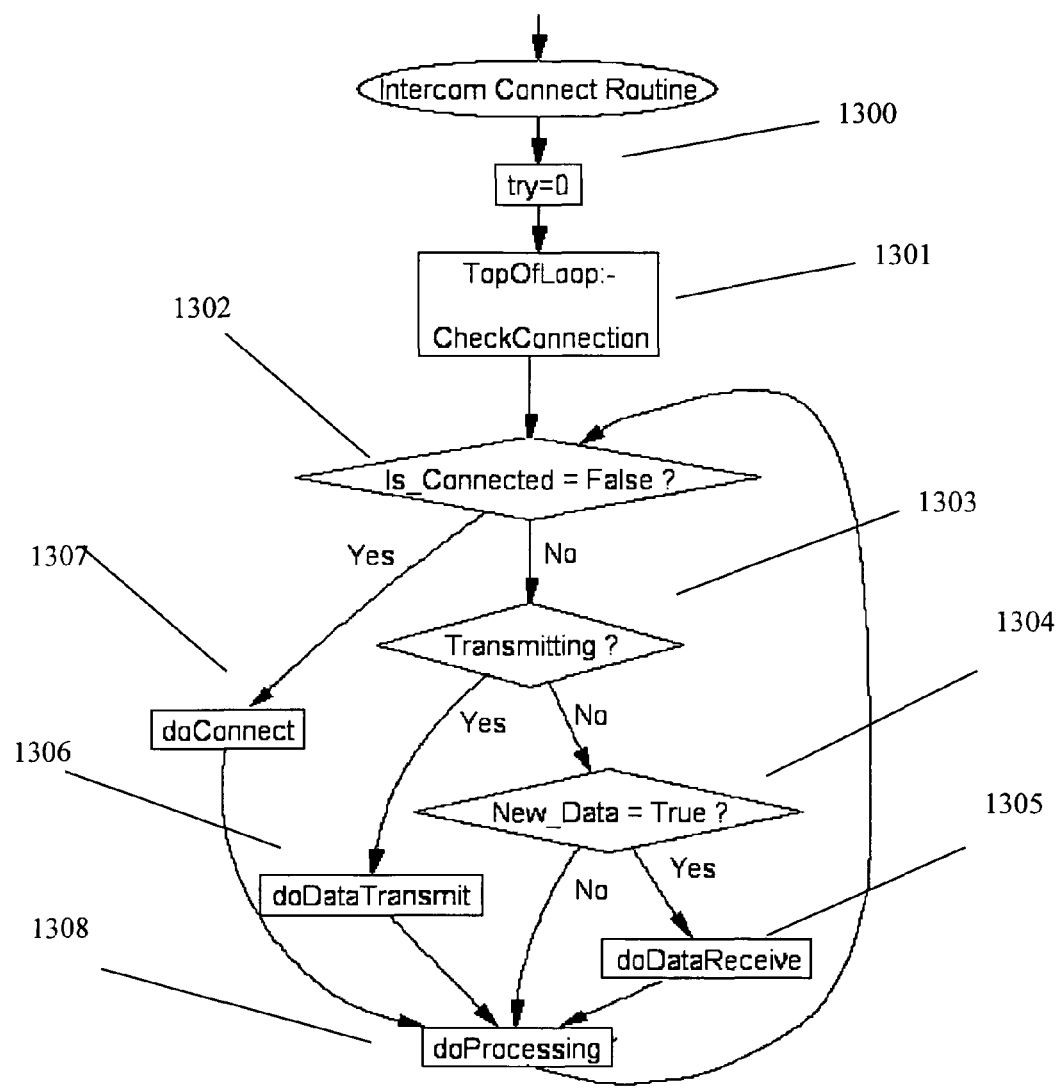
FIGS. 13-16 show a flowchart of the forwarding or failure recovery procedure according to an embodiment of the invention.

FIG. 13 shows a process invoked inside the main processor loop of an intercom, such as the one shown in FIG. 4 that may be operating in a inter-connection arrangement such as FIG. 3. After power initialization (1300), the TCP/IP connect state is checked (1302). If connection has been established with the Console, routines are executed for audio and data transmit (1303, 1306), reception (1304,1305) and general intercom processing (1308) which may include events such as switch decoding, timed events, memory management and data exchanges.

Figure 14:
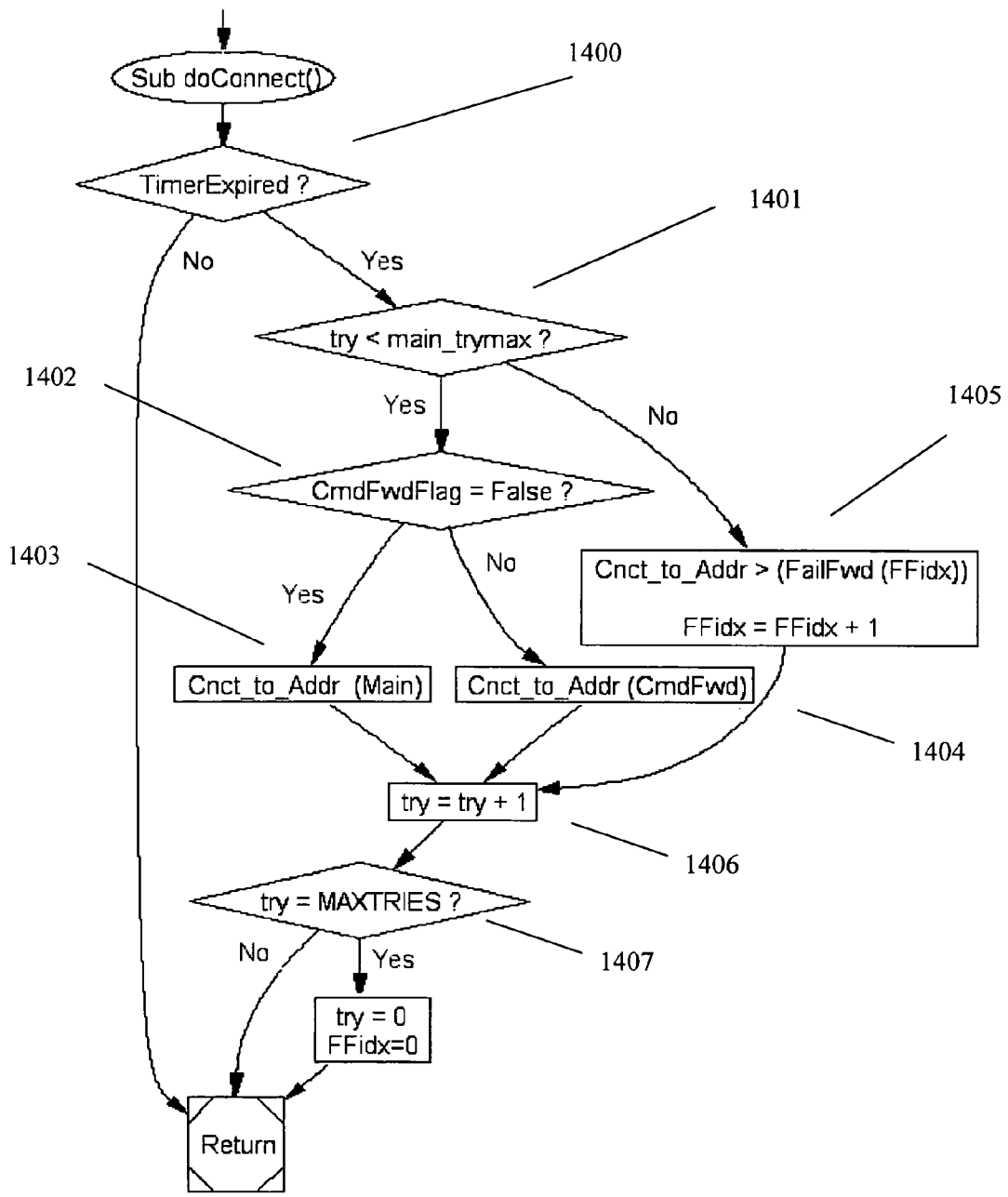
Figure 15A:
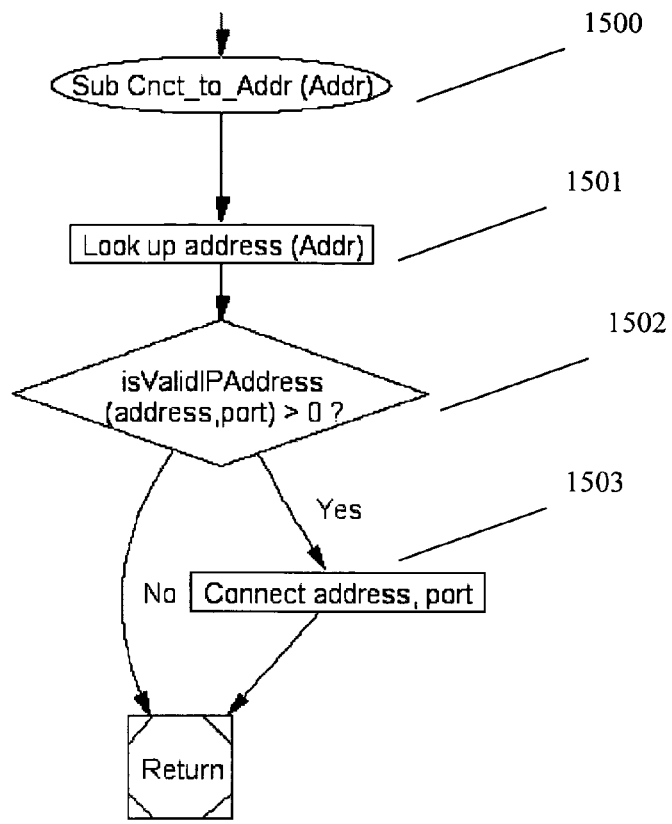
Figure 15B:
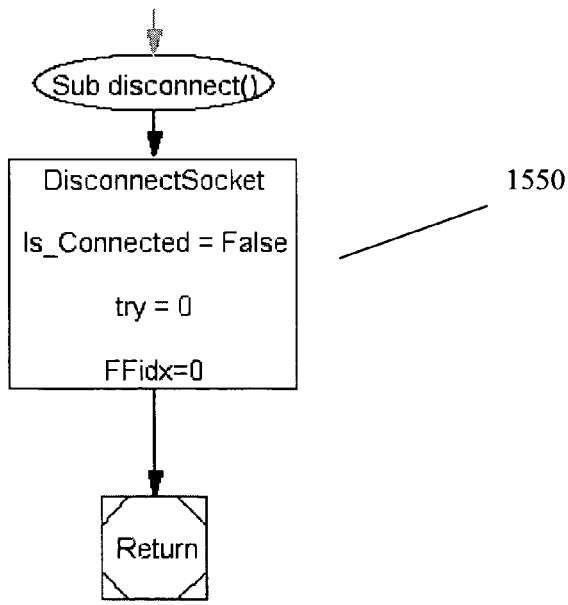

All Fail Forwards processes are invoked when a connection is NOT detected (1302) and the doConnect (1307) routine is processed, further described n FIG. 14.

The doConnect (1400) algorithm is used to load calls of subroutine 'Connect to Address' (Cnct_to_Addr) with a destination 'listener' IP and Port addresses. Counters and memory locations provide addresses for Main, Alternate (Fail Forward) and Specified (Command Forward) server destinations. These destinations are used by the Intercom, in Client mode, to request a listener connection.

The doConnect (1400) provides a timer that may be at intervals to prevent rapid execution and re-entry into the routine, or to enhance connection sequences. If an interval is triggered then a try counter is tested (1401) to invoke certain connection processes. In initial connection attempts, when try is less then main_trymax (which may be a number such as 10), an external flag is tested (1402) and if not set, indicating an external command has invoked connection (1404), the Main IP and port is loaded for connection (1403). If the connection process is not successful the process will loop, incrementing 'try' (1406), and recurring at timed intervals until main_trymax is reached. For example, 10 attempts may be made at 10-second intervals to reach the Main server console.

When main trymax is reached (1401), indicating the MAIN server was not available, a set of Fail Forward addresses may be loaded for subsequent connection attempts (1405). Each timed loop of doConnect may then increment the FFidx (Fail Forward Index) for connection attempts to a plurality of FFidx addresses stored in memory (518). The total count of main_trymax and number of FFidx indexes loaded is held in a variable MAXTRIES. This variable is tested, and if exceeded (1407), forces counter resets to provide a fresh restart of timed connection attempts. Resets also occur at a TCP/IP disconnect (1550), such that new connection sequences following termination of connections, begin with the Main address.

The Cnct_to_Addr (Connect to Address) routine called in FIG. 14 is further described in 15A. Addresses passed with the calls in FIG. 14 are retrieved from memory (1501) and validated in (1502). The connection is attempted using TCP/IP handshaking (1503) a via the TCP/IP stack (505). The is_Connected Flag in memory is asserted on successful connection.

Advantageously, a network connection and lookup for indexes may be executed in 1051, to provide a means to have dynamic content in local memory (505).

Figure 16:
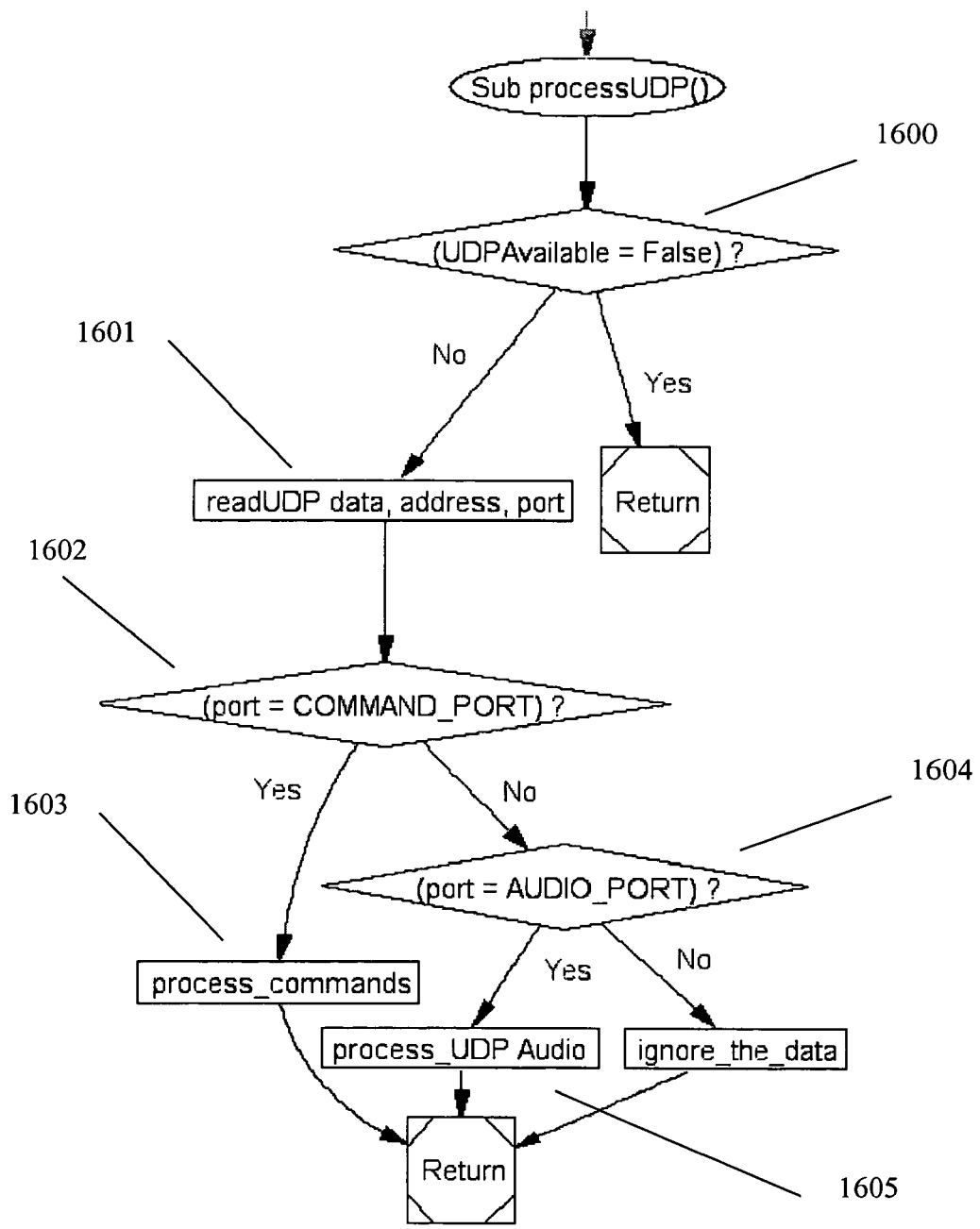

A supporting process utilizing UDP broadcasting is shown in FIG. 16. The reception of UDP packets may invoke a means of storing the local memory (518) locations with IP addresses, port locations and user information utilized in Cnct_to_Addr. UDP may also be used to decode external commands used for control, such as the Command_Forward flag (1404), used to redirect and intercom to a new target listener Console.

If UDP is available (1600), the processor (505) may read the broadcast on a designated port for commands (1601), decode the commands (1603) and further control the intercom based on the commands. Advantageously the UDP broadcast may use a designated audio port (1604) to further process the UDP data digital to analog conversion for activities such as audio paging.

In addition to UDP, versions of the invention envision a means of programming Main and FailForward addresses via network servers via HTTP interfaces, and during valid TCP/IP connections.

What is claimed is:

1. A system comprising:
    two or more computers with multimedia audio support coupled to a network;
    a software program in each computer having instructions to manage two or more TCP/IP connections between said computer and two or more dedicated audio communication terminals on said network;
    at least two audio communication terminals, each coupled to said network and containing an IP address, an audio transducer, an audio codec and processor connected to said transducer to exchange IP data and control signals between the computer and the audio communication terminals over the network and,
    wherein said audio communication terminals provide real time audio connectivity and contain program instructions to establish a first network connection between said terminal and a first computer at said IP address, to monitor connection status of said first network connection, and to establish a network connection to a second computer at a second IP address if said first network connection fails;
    wherein the computers receive TCP/IP connection requests from said dedicated audio communication terminals and upon establishment of a connection a computer and an audio communication terminal can exchange data and digitized audio; and
    wherein the computer software contains instruction to control the network connection state and the audio modes of the audio communication terminal.

2. The system of according to claim 1 wherein said connection is a wireless network connection.

3. The system according to claim 1, wherein said audio communication terminal further comprises a voice activated threshold sensor signaling the transmission of digital audio data.

4. The system according to claim 1, wherein said software program further includes command protocol instructions capable of distinguishing audio information from control code information.

5. In an audio communication system having a first communication server with an operator interface coupled to a network, a second communication server coupled to said network and one or more audio communication terminal clients coupled to said network, a communication method comprising the steps of:
    monitoring the network for a client connection request at said first communication server;
    establishing a TCP/IP network connection between said communication server and a client providing for real time audio connectivity after said communication server receives a client connection request;
    present indication of client through operator interface upon establishing TCP/IP connection;
    monitor user interface for operator instruction; and
    processing operator instruction and transmitting to said client an IP address representing an alternate server address for said second communications server to be stored in said client and to be used by said client in the absence of an operator response upon expiration of a time period.

6. A method according to claim 5, further comprising the step of receiving data over said connection and converting said data to audio output.

7. A method according to claim 5 further comprising the step of transmitting data representing audio information to said connection.

8. A method according to claim 7 further comprising the step of retrieving said IP address representing an alternate server address from storage.

9. A method according to claim 5 wherein the step of processing comprises transmitting an IP address representing an alternate server in the absence of an operator response upon expiration of a timed period.

10. A method according to claim 5 wherein the step of processing comprises transferring said connection to an alternative communication server.

11. A method according to claim 5 further comprising the steps of initiating a timeout sequence upon establishing said TCP/IP connection and in the event of expiration of said timeout sequence prior to actuation of an operator instruction, transferring a communication session to an alternative operator console.

12. A method according to claim 5 further comprising the steps of notification one or more alternative operator consoles of the client connection request and transferring a communication session to one of said alternative operator consoles upon receipt by said communication server of a transfer request.

13. A method according to claim 12 further comprising the step of presenting said notification through an operator interface of said alternative console and issuing transfer request upon activation through said user interface of said alternative console.

14. In an audio communication system having two or more communications servers, each coupled to a network and one or more communication devices, a method comprising the steps of:

an audio communication device for real time audio connectivity issuing a TCP/IP connection request to a first address associated with a first communications server stored in said audio communication device in response to a trigger at said audio communication device;

monitoring a connection status to said first communications server at said first address; and issuing a further TCP/IP connection request to an alternate address associated with a second communications server stored in said audio communication device based upon an alternate connection trigger.

15. A method according to claim 14 wherein said alternate connection trigger is user input at said client.

16. A method according to claim 14 wherein said alternate connection trigger is the expiration of a preset time period to establish a connection.

* * * * *